US008515807B2

(12) United States Patent
Tyler et al.

(10) Patent No.: US 8,515,807 B2
(45) Date of Patent: Aug. 20, 2013

(54) METHODS AND SYSTEMS FOR RETAIL CUSTOMER REFERRAL COMPENSATION PROGRAMS

(75) Inventors: J. Benjamin Tyler, Orem, UT (US); Kenneth D. Roland, Orange Park, FL (US); Thomas Thornton, Granite Bay, CA (US); DelMar P. Williams, Highland, UT (US); Kevin F. Baadsgaard, Spanish Fork, UT (US)

(73) Assignee: Motherlode Network, American Fork, UT (US)

( * ) Notice: Subject to any disclaimer, the term of this patent is extended or adjusted under 35 U.S.C. 154(b) by 0 days.

(21) Appl. No.: 13/234,525

(22) Filed: Sep. 16, 2011

(65) Prior Publication Data

US 2012/0239472 A1    Sep. 20, 2012

Related U.S. Application Data

(63) Continuation-in-part of application No. 11/951,466, filed on Dec. 6, 2007.

(51) Int. Cl.
*G06Q 40/00* (2012.01)
(52) U.S. Cl.
USPC .................................................. 705/14.16
(58) Field of Classification Search
None
See application file for complete search history.

(56) References Cited

U.S. PATENT DOCUMENTS

| 6,421,648 | B1 | 7/2002 | Gagnon et al. | |
|---|---|---|---|---|
| 7,149,707 | B2 | 12/2006 | Scoble | |
| 2002/0147625 | A1* | 10/2002 | Kolke, Jr. | 705/9 |
| 2004/0093269 | A1 | 5/2004 | Rubin et al. | |
| 2004/0158537 | A1 | 8/2004 | Webber et al. | |
| 2005/0222967 | A1 | 10/2005 | Adir | |
| 2007/0156445 | A1 | 7/2007 | Manuel et al. | |
| 2007/0260513 | A1* | 11/2007 | Pavlov | 705/14 |
| 2008/0077485 | A1 | 3/2008 | Scrudato | |
| 2008/0281681 | A1* | 11/2008 | Bremner et al. | 705/11 |
| 2008/0320004 | A1* | 12/2008 | Jain et al. | 707/10 |
| 2012/0296783 | A1* | 11/2012 | Barnett et al. | 705/30 |

FOREIGN PATENT DOCUMENTS

| JP | 2006323799 | 11/2006 |
|---|---|---|
| KR | 20040022794 | 3/2004 |

OTHER PUBLICATIONS http://www.mlmconsultant.com/mlmlibrary_matrix_mlm.htm (website accessed Mar. 2, 2012).

* cited by examiner

*Primary Examiner* — Thomas M Hammond, III
(74) *Attorney, Agent, or Firm* — Kirton McConkie; Michael F. Krieger

(57) ABSTRACT

Embodiments of the present invention relate generally to business methods and systems for retail marketing, and specifically to Retail Customer Referral Compensation Programs for using Performance-Driven criteria to award Production Points for creating a Position Changing Point Driven matrix and determining a Referring Customer's position and compensation within that matrix.

13 Claims, 15 Drawing Sheets

Retail Customer Referral Compensation Program
Performance-Driven Floating Matrix (PDFM)
Customer Repositioning Based on Production Points

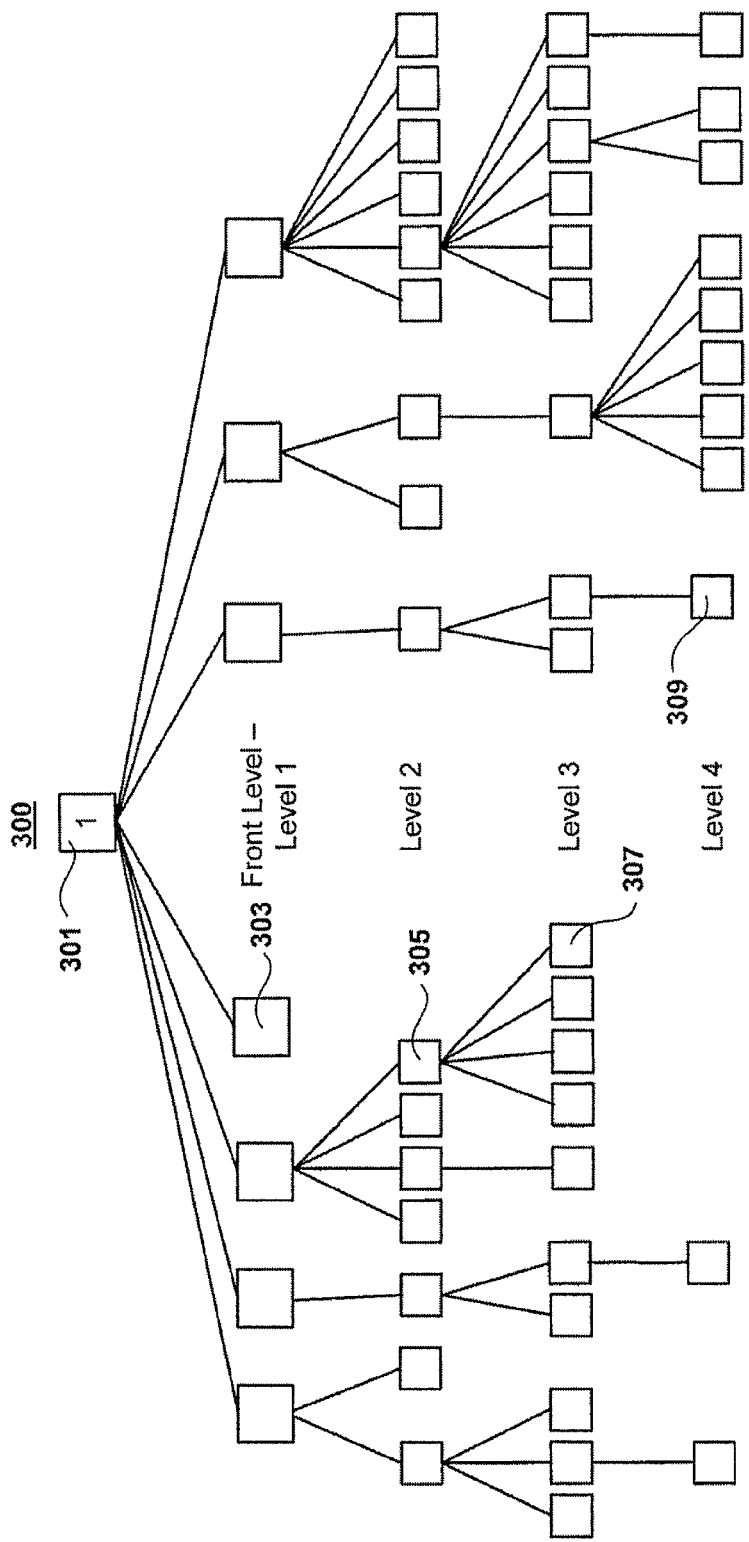

Retail Customer Referral Compensation Program
Performance-Driven Floating Matrix (PDFM)
Periodic Repositioning Based on Total Points Retail Customer Referral Compensation Program
Performance-Driven Floating Matrix (PDFM)
Before Periodic Repositioning Retail Customer Referral Compensation Program
Performance-Driven Floating Matrix (PDFM)
Alternating Forced L-R,R-L,L-R,R-L Placement

501
⎣ HOW A REFERRING CUSTOMER MAY EARN PRODUCTION POINTS 12 points – For signing-up on Auto-Purchase Program.
    1 points – Each consecutive month on Auto-Purchase Program.
    5 Points – Each Personally Enrolled Enrolling Customers.
    3 Points – Each Personally Enrolled Second Level Customers.
    2 Points – Each Personally Enrolled Third Level Customer
    1 Point – Each Personally Enrolled Fourth Level Customer
    10 Points – $25,000 Total Group Volume
    20 Points – $50,000 Total Group Volume

503
⎣ EXAMPLES OF HOW A REFERRING CUSTOMER MAY EARN PRODUCTION POINTS 12 points – For signing-up on Auto-Purchase Program.
    15 Points – 3 Personally Enrolled Enrolling Customers (5 points each)
    15 Points – 5 Personally Enrolled Second Level Customers (3 points each)
    20 Points – 10 Personally Enrolled Third Level Customers (2 points each)
    62 Points – Total Monthly Performance Points

505
⎣ EXAMPLES OF HOW A REFERRING CUSTOMER MAY EARN PRODUCTION POINTS 12 points – For signing-up on Auto-Purchase Program. (PE 1 ea. Month for 3 months)
    3 points – 3 consecutive months on Auto-Purchase Program.
    25 Points – 5 Personally Enrolled Enrolling Customers (5 points each)
    45 Points – 15 Personally Enrolled Second Level Customers (3 points each)
    40 Points – 20 Personally Enrolled Third Level Customers (2 points each)
    18 Points – 18 Personally Enrolled Fourth Level Customers (1 point each)
    20 Points – 5 Personally Enrolled Retail or Auto-Purchase Customers (4 points each)
    163 Points – Total Monthly Performance Points

507
⎣ EXAMPLES OF HOW A REFERRING CUSTOMER MAY EARN PRODUCTION POINTS 12 points – For signing-up on Auto-Purchase Program. (PE 1 ea. mo. for 8 mos.)
    8 points – 8 consecutive months on Auto-Purchase Program.
    50 Points – 10 Personally Enrolled Enrolling Customers (5 points each)
    150 Points – 50 Personally Enrolled Second Level Customers (3 points each)
    500 Points – 250 Personally Enrolled Third Level Customers (2 points each)
    400 Points – 400 Personally Enrolled Fourth Level Customers (1 point each)
    10 Points – $25,000 Total Group Volume
    1130 Points – Total Monthly Performance Points Retail Customer Referral Compensation Program
                        Personal Genealogy Downline Points

FIG. 5A

Retail Customer Referral Compensation Program
Performance-Driven Floating Matrix (PDFM)
Periodic Repositioning Based On Production Points Retail Customer Referral Compensation Program
Performance-Driven Floating Matrix (PDFM)
Periodic Repositioning Based on Production Points Retail Customer Referral Compensation Program
Performance-Driven Floating Matrix (PDFM)
Commission and Bonus Programs Retail Customer Referral Compensation Program
Personal Enroller Matching Bonus Retail Customer Referral Compensation Program
Global Matching Bonus Retail Customer Referral Compensation Program
Performance-Driven Floating Matrix (PDFM)
Commission and Bonus Programs

METHODS AND SYSTEMS FOR RETAIL CUSTOMER REFERRAL COMPENSATION PROGRAMS

CROSS-REFERENCE TO RELATED APPLICATIONS

This application is a continuation-in-part of prior application Ser. No. 11/951,466 filed Dec. 6, 2007, which is herein incorporated by reference.

FIELD OF THE INVENTION

The present invention relates generally to business methods and systems for retail marketing, and specifically to retail customer referral programs for using production-based criteria to award points for determining a retail customer's position in a Position Changing Point Driven compensation plan in a network and retail marketing organization.

It could be applied to existing basis compensation plans of all types including breakaway, unilevel, matrix, binary and other plans or it could be used as a plan itself

BACKGROUND OF THE INVENTION

Network marketing, also known as Multi-level marketing or MLM, is a business model that combines direct retail marketing with a salesforce of independent contractors. Network marketing is an alternate channel for a manufacturer or retailer to advertise, sell and deliver its products to market. Other channels may include retail storefronts, catalog shopping, and door-to-door sales.

Network marketing businesses usually function by enrolling unsalaried salespeople, also known in the business as Independent Distributors, Independent Business Owners, Sales Consultants, etc., (hereinafter "Independent Distributor") to sell products and earn additional sales commissions based on the sales of people recruited into their downline, an organization, that includes direct recruits, recruits' recruits and so on such that there may be multiple levels of people receiving commissions from one person's sales.

Network marketing offers several advantages over the other retail channels such as low advertising overhead. Unlike a typical retail company, the network marketing company doesn't have to spend large amounts of money to obtain customers. Instead, it pays Independent Distributors to expose and promote the product out into the marketplace. In addition, the company only has to pay the Independent Distributor a percentage commission on products actually sold.

In a traditional network marketing organization Independent Distributors are rewarded for the sales they create, not only directly, but indirectly as well. Independent Distributors earn profit from any retail sales they make, plus they also may earn a bonus or override on the sales made by people they recruited into the company, and the people they recruited, and the people they recruited, etc. By getting a small percentage from many people, their income can grow to a very large number.

Over the years, companies have developed a variety of network marketing compensation plans. Some of these include breakaway, unilevel, matrix, and binary.

The traditional "matrix" is a plan with a structure that has a fixed "shape" that determines the size of the organization, or personal enroller genealogy, the Independent Distributor can be paid on. For example, if a company uses a 4×4 matrix, the Independent Distributor can have no more than 4 people on their "frontline", and can be paid no more than 4 levels deep. If they already have 4 people on their frontline, any future people they enroll will have to be "placed" somewhere below those 4 frontline people. This is called "spillover".

Matrix plans limit the width of each level in an Independent Distributor's group, forcing successful recruiters to position their recruits under other people who did not recruit them ("spillover"). Spillover therefore can be viewed as either a curse or a blessing, with proponents saying it's a great way to cause people to help their downlines since recruits will automatically be placed below their downline distributors. Spillover also tends to keep people active, because they don't want to lose out on the recruits spilling over from their upline. Others argue that spillover rewards weak and non-performing Independent Distributors, because if an Independent Distributor is producing, they will already have people below them, causing new recruits to likely be placed in the "holes" under non-producers. In a traditional fixed matrix plan, an Independent Distributor remains permanently in the original position into which they were recruited and so has little incentive to recruit additional participants once their matrix downline is full.

These plans typically have some provisions for paying commissions and incomes on the volume of sales made during a certain time period. There is typically a minimum "group volume" requirement for an Independent Distributor to qualify for these commissions. The number of levels of volume in the matrix the Independent Distributor is paid on and the percentages they receive are dependent on the company and the position they have reached. In a conventional matrix marketing plan the sales volume made by an Independent Distributor only benefits their direct personal and/or placement upline.

Accordingly, there is a need in the industry for improved methods and systems for implementing and managing a retail customer referral compensation program with a Position Changing Point Driven matrix plan wherein Independent Distributors may periodically move up and be repositioned in the organizational structure to qualify for commissions and bonuses that they would not qualify for in a traditional fixed matrix plan.

SUMMARY OF THE INVENTION

In one aspect, a method for compensating Referring Customers participating in a Retail Customer Referral Program includes the steps of providing a Position Changing Point Driven (PCPD) matrix, providing a position within the PCPD matrix for each production unit achieved within the Retail Customer Referral Program during the previous production period, awarding production points to the Referring Customers based on achieving specific criteria during the previous production period, filling the provided positions within the PCPD matrix with the Referring Customers that have the highest number of awarded production points, and compensating Referring Customer positioned in the PCPD matrix based on their position within the PCPD matrix and based on one or more compensation plans.

Implementations may include one or more of the following features. The method may include the step of performing a repositioning of the Referring Customers within the PCPD matrix during at the end of each production period. The predefined number of production units may be achieved for each product sold and the number of production points allocated to each product. The number of production units allocated to each product may depend upon the value of the product. The step of filling the provided positions within the PCPD matrix may include positioning the Referring Customers in the PCPD matrix in order from the top down and from left to right based on the number of production points awarded to each Referring Customer. The last level of the PCPD matrix may be filled based on a left to right, right to left, left to right placement plan. The dimensions of the PCPD matrix may be a binary matrix, a 2×2 matrix, a 3×3 matrix, a 4×4 Matrix, a 5×5 matrix, a 6×6 matrix, a 7×7 matrix, a 8×8 matrix, a 9×9 matrix, or a 10×10 matrix. The step of filling the provided positions within the PCPD matrix may include filling the PCPD matrix in order from highest positions to lowest positions with the positions being filled in order from the Referring Customers with the highest number of production points to the Referring Customers with the lowest number of production points. In the case that two or more Referring Customers have the same number of production points, the Referring Customer that is the most recently enrolled may be positioned before the other Referring Customer. The production period may be one month. The one or more compensation plans may include a plan a bonus payout plan, a matching bonus payout plan, a personal enroller matching bonus, or combinations thereof.

In another aspect, a system for compensating Referring Customers participating in a Retail Customer Referral Program includes a plurality of Referring Customers, a Position Changing Point Driven (PCPD) matrix, wherein the number of positions within the PCPD matrix equals the number of production units achieved by the plurality of Referring Customers during the previous production period, a Production Point plan whereby Referring Customers are awarded Production Points based on achieving specific criteria during a production period, wherein the positions within the PCPD matrix are assigned to the Referring Customers who achieved the highest number of Production Points during the previous production period, and a compensation scheme associated with the PCPD matrix, wherein the Referring Customers assigned to positions within the PCPD matrix are compensated based in part on the Referring Customers position within the PCPD matrix.

Implementations may include one or more of the following features. The predefined number of production units may be achieved for each product sold and the number of production points allocated to each product. The number of production units allocated to each product may depend upon the value of the product. The Production Point plan may award points for becoming a newly enrolled Referring Customer, personally enrolling new Referring Customer, personally enrolling new Auto-Purchase Customer, reaching a specific Group Sales Volume, or completing a training segment.

Additional objects and advantages of the invention will be set forth in the description which follows, and in part will be obvious from the description, or may be readily learned by the practice of the invention. The objects and advantages of the invention may be realized and obtained by means of the instruments and combinations particularly pointed out in the description. These and other objects and features of the present invention will become more fully apparent from the following description, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 3A illustrates a Retail Customer's Personally Enrolled Downline (Personal Genealogy) used for qualification purposes;

FIG. 5A illustrates an exemplary table of Retail Customer's Personal Genealogy Downline Points;

DETAILED DESCRIPTION OF THE INVENTION

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Figure 1:
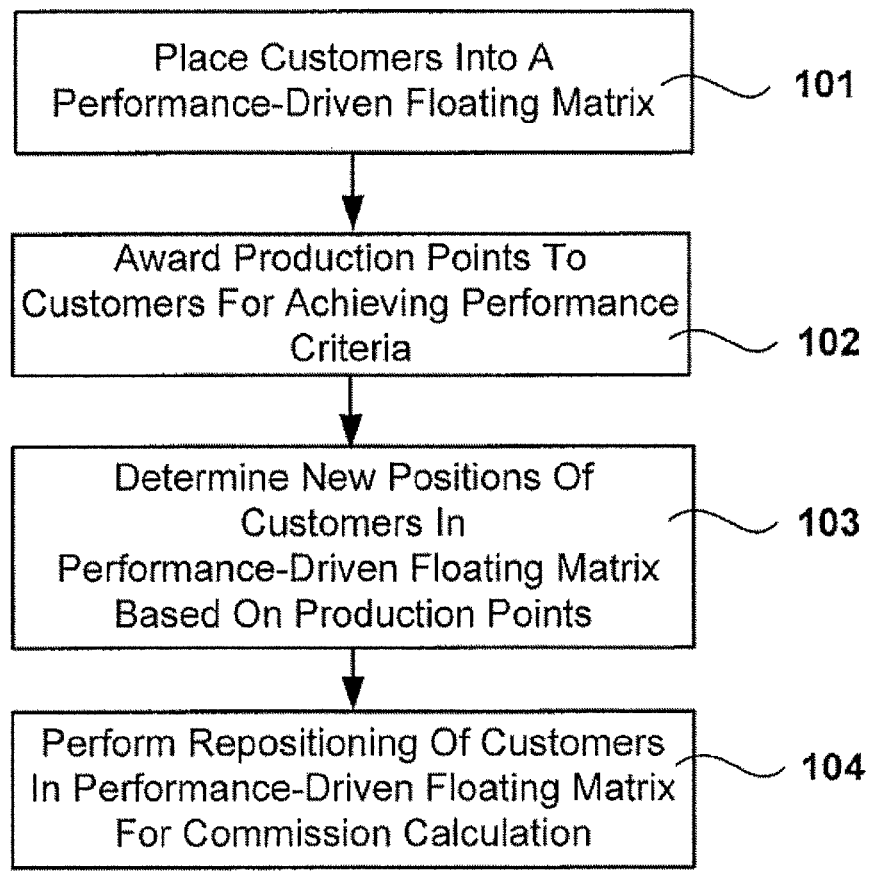
FIG. 1 illustrates a flowchart of a method for awarding Production Points to customers to determine periodic repositioning in a Position Changing Point Driven (PCPD) Matrix.

Some embodiments of the present invention, described with reference to FIG. 1, may comprise placing customers 101 into a Position Changing Point Driven (PCPD) matrix, which can also be referred to as a Performance Driven Floating Matrix (PDFM) with customers placed according to their Production Points (also referred to as "points") earned that commission period. Points may then be awarded 102 to these customers for achieving specified performance criteria. Referring Customer (also referred to simply as "customers") are customers that not only purchase products but also refer other customers to the sales system. Referring Customers performance may be measured over any period of time, such as a month, for a variety of performance criteria such as sales, training, and enrolling which leads to increased sales. Once points have been awarded, new positions may then be determined 103 for the customers in the PCPD matrix based upon the number of points awarded to each customer. When new positions have been determined, customers may then be repositioned 104 in a new position in the PCPD matrix for the next period. These positions are used to calculate at least a part of the commissions of each Referring Customer during that period.

Figure 2:
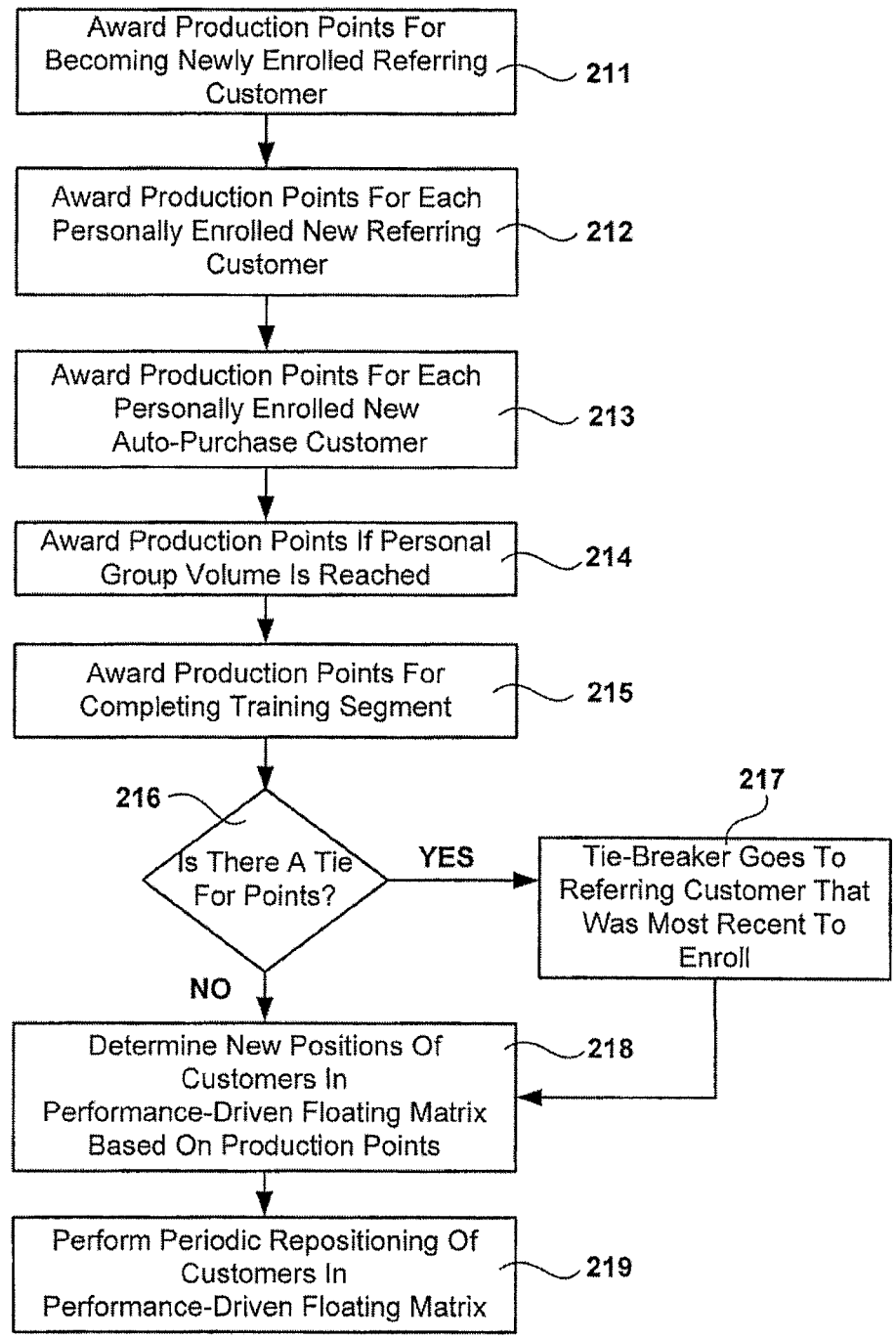
FIG. 2 illustrates a flowchart of a method for awarding Achievement-based Production Points to determine periodic repositioning of Referring Customers in a PCPD Matrix.

In some embodiments of the present invention, described with reference to FIG. 2, points may be awarded 211 for becoming a newly enrolled Referring Customer. These points may be awarded to jump start newly enrolled Referring Customers and encourage them to add additional customers. This may also promote consistency in enrollment as well as continuous retail consumption. In some embodiments, twelve points may be awarded for becoming a Referring Customer. One point may then be deducted each month a customer does not enroll a new customer. The monthly point deductions may have limits. For example, new Referring Customers may be given 12 jumpstart points that will be reduced by one point for each month they do not enroll another active customer into the program. The participant may never lose more than the original 12 points over any period of time. If a Referring Customer enrolls one or more customers in any month, the Referring Customer will keep their remaining jumpstart points. If a Referring Customer does not enroll any customers in a month, they will lose one of the original jumpstart points. This process will continue until all 12 jumpstart points have been lost thereby giving new enrollees another opportunity to move up in the marketing plan ahead of those that don't perform well.

In some embodiments there are many categories of customers. For instance customers can include Auto-Purchase Customers that automatically purchase a certain number of products each time period. Customers may also include Referring Customer, which both purchase product and participate in the PCPD matrix. Customer may also include Preferred Customers who purchase large amounts of product, or who meet other special qualifications. A variety of other types of customers may be included in the system. Different point values may be awarded for different types of customers enrolled. For example, one point may also be awarded for each consecutive month as an Auto-Purchase Customer.

In some embodiments, points may also be awarded 212 for each personally enrolled new Referring Customer. These points continue the emphasis on teamwork for enrolling new customers. In some embodiments, five points may be awarded for each personally enrolled Referring Customer and three points may also be awarded for each $2^{nd}$ generation enrollee as Referring Customer, two points for each $3^{rd}$ generation enrollee as Referring Customer and one point for each $4^{th}$ generation enrollee as Referring Customer.

In some embodiments, points may also be awarded 213 for personally enrolling new Auto-Purchase Customer or Preferred Customer. These points continue the emphasis on individually enrolling new retail customers. This benefits everyone in the program because Auto-Purchase Customers and Preferred add volume but do not participate in the compensation plan. In some embodiments, four points may be awarded for each personally enrolled retail or Auto-Purchase Customer. Similarly, four points may be awarded for each personally enrolled Preferred Customer.

In some embodiments, points may also be awarded 214 to groups of Referring Customers for group achievements. For example, in 4×4 PCPD matrix, a group of a Referring Customer may include an entire four-level matrix. These points reward team-building accomplishments. In one instance, ten points may be awarded for reaching a personal group sale volume of $25,000. In another instance, twenty points may be awarded for reaching a personal group volume of $50,000. Even more points may be awarded for reaching even higher group volumes.

In some embodiments, points may also be awarded 215 for completing a training program or programs. These points give flexibility for a company to promote attendance at various training functions. In some embodiments, one point may be awarded for completing each segment of a training program.

At the end of each compensation period, all the points awarded may be added up to determine 218 the new position of each customers on the PCPD matrix. In some embodiments these calculations are done automatically, such as by a computer system. Once points are awarded the PCPD matrix is repositioned. However, in some instances, the Personal Enrolled Downline matrix (or Personal Genealogy matrix) remains constant. The purpose of a second, PCPD, matrix is to incentivize Referring Customers to continuously perform. This second, PCPD matrix can be used to compensate Referring Customers on top of a separate compensation program, such as a purely commission based compensation plan to is based on a first, Personally Enrolled Downline matrix as well as personal sales for that period.

Repositioning within the PCPD matrix allows new customers to move up within the PCPD matrix, based solely on personal performance, rather than based on the timing of their entry into the sales system. By performing well each time period, even new customers may move up in the matrix ahead of those that got into the system earlier but who that did not perform as well that period. In the case of a tie for points 216 a tiebreaker 217 may go to the Referring Customer who was most recent to enroll.

Figure 3B:
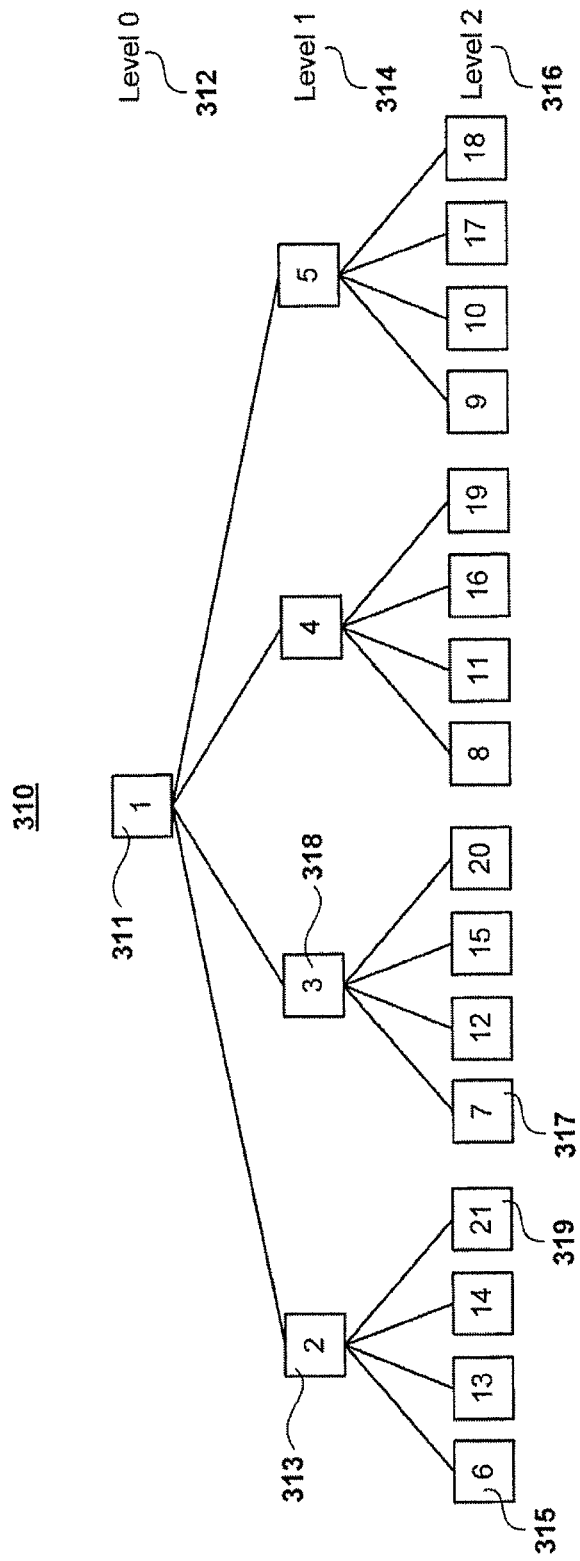
FIG. 3B illustrates a PCPD Periodic Repositioning based on total points.

As mentioned above, in some embodiments customers may be symbolically positioned within multiple matrices. For example, as described with reference to FIG. 3A, customers may be included in a Personally Enrolled Downline 300 or genealogy, which may resemble a traditional multi-level marketing matrix hierarchy. This matrix is created when Referring Customers enter the system. Each Referring customer is generally placed in the matrix in a position below the individual who referred them to the system. The Personally Enrolled Downline 300 may be used to compensate Referring Customers for sales they made that period and also for sales made by those in there Personally Enrolled Downline during that same period. These referred individuals may include various types of customers, including, for example, Retail Customers, Auto-Purchase Customers, Preferred Customers and other Referring Customers that are personally referred by Referring Customer 1 301.

In some embodiments there may be no width limits in the Personally Enrolled Downline 300 and a Referring Customer may have an unlimited number of customers in their Personally Enrolled Downline 300 and Referring Customer One's 301 Front Level or Level One 303 may have an unlimited number of Retail Customers, Auto-Purchase Customers and Referring Customers that were personally referred by Referring Customer 1 301. In some embodiments the Second Level or Level Two 305 may also comprise an unlimited number of additional Retail Customers, Auto-Purchase Customers and Referring Customers that were personally referred by Referring Customer One's 301 Front Level or Level One 303. In some embodiments the third level or Level Three 307 and fourth level or Level Four 309 may also comprise an unlimited number of additional Retail Customers, Auto-Purchase Customers and Referring Customers that were personally referred by Referring Customers in the level above them. The Personally Enrolled Downline 300 may continue down with additional levels and may be as deep as needed to place all of the customers in the Referring Customer's genealogy or Personally Enrolled Downline.

As discussed above, in some embodiments, the Personally Enrolled Downline is be used to calculate points that are used in a second matrix, the PCPD matrix. These embodiments, described with reference to FIG. 3B, may comprise a PCPD matrix 310. Positioning within the PCPD matrix is based on points received during the prior compensation period, rather than on sales and genealogy, as with the Personally Enrolled Downline. In some embodiments, these points are awarded for achieving performance-based criteria and totaled each compensation period. Each Referring Customer is then assigned a position within the PCPD matrix, based on their points. The highest point earners are positioned in the highest matrix positions.

One embodiment of a PCPD matrix 310 having three levels and twenty one positions, a first Referring Customer or Customer One 311, who has received the most points during the prior production period, is placed on Level Zero 312. Customer Two 311 is placed under Customer One on Level One 314. Customer Two received fewer points that Customer One during the prior production period. Level One is filled from left to right, with Customer Two 313 having the third highest amount of production points during the previous period. Level Two 316, may comprise sixteen positions for sixteen additional Referring Customers. The Referring Customers on Level Two 316 may be placed in consecutive order from left to right, right to left and left to right with Customer Six 315 placed under Customer Two 313 and Customer Seven 317, placed under Customer Three 318 and so forth continuing on down to the Referring Customer with the least amount of points, Customer Twenty One 319, being placed in the final spot under Customer 2 313.

Figure 4A:
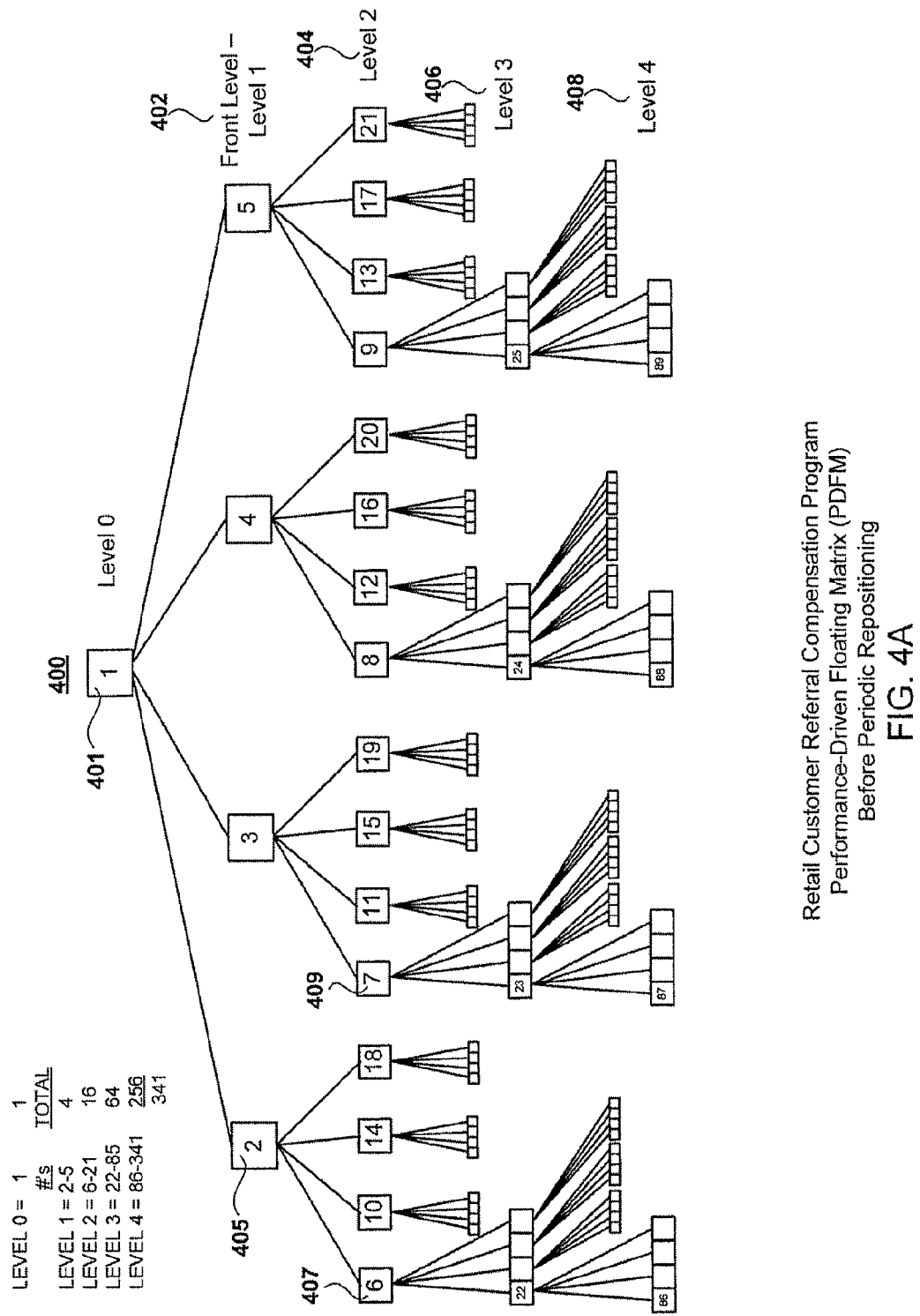
FIG. 4A illustrates a PCPD before Periodic Repositioning.

In some embodiments, described with reference to FIG. 4A, a PCPD matrix 400 utilizes a purely left to right placement plan for adding newly enrolled Referring Customers. The PCPD matrix 400 may comprise a first Referring Customer 401, with a front line or Level One 402 of Referring Customers placed under them with less production points for that compensation period. The front line or Level One 402 customers are placed from left to right in the matrix based on production points for that compensation period with the second highest point earning customer, Customer Two 405, being placed in the first position on the left with additional Referring Customers are positioned in this level from left to right until the level is full. A Second Level 404, includes additional customers placed under each of the Level One 402 customers. These Level Two 404 customers earned fewer production points than the Referring Customers on Level One. The Level Two 404 Referring Customers are placed from left to right in the matrix based on production points for that compensation period with the highest Referring Customer in Level Two or Customer Six 407 being placed in the first position on the left under Customer Two 405. Customer Seven 409 is placed in the first position on the left under Customer Three, and so forth. A Third Level 406 further comprises additional customers placed under each of the Level Two 404 Referring Customers. A Fourth Level 408 further comprises additional customers placed under each of the Level Three 406 customers in the same left to right order. Additional levels may be added as needed. FIG. 4A illustrates a 4×4 PCPD matrix 400 with 4 levels and 341 customers.

Figure 4B:
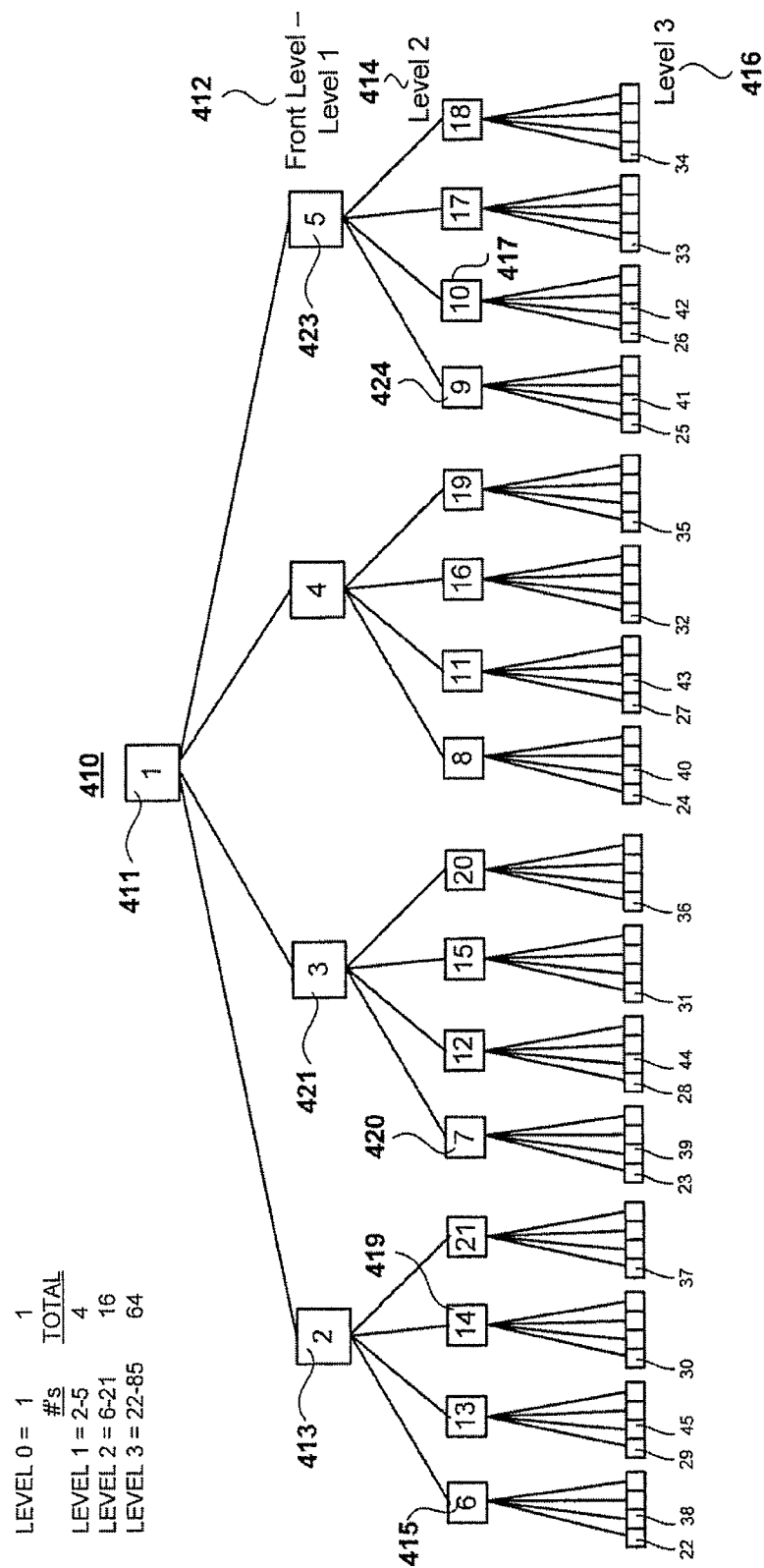
FIG. 4B illustrates a Retail Customer Referral Compensation Program PCPD with an alternating forced L-R, R-L, L-R, R-L placement.

Some embodiments of the present invention, described with reference to FIG. 4B, may comprise a PCPD matrix 410, which utilizes a left to right, right to left, left to right and right to left placement plan for placing Referring Customers. The PCPD matrix 410 may comprise a first customer 411, with a front line (Level One) 412 of customers placed under them. A Second Level, 414, may comprise additional customers placed under each of the Level One 412 customers. The Level Two 414 customers are positioned based on an alternating left to right, right to left, left to right and right to left placement plan, based on their respective points for the previous compensation period. The highest customer in Level Two, or Customer Six 415, being placed in the first position on the left under Customer Two 413 and the second highest Referring Customer in Level Two, or Customer Seven 420, being placed in the first position on the left under Customer Three 421, and so forth down the level. Once all the first positions on the left are filled the next Referring Customer will be placed in the second position under the last customer in the level above. In this example Customer Ten 417 is placed in the second position under Customer Five 423 and to the right of Customer Nine 424 with Customers Eleven, Twelve, and Thirteen placed in similar fashion moving back to the left with Customer Fourteen 419 being placed in the third spot under Customer Two 413. This alternating left to right, right to left placement pattern may be repeated until Level Two 414 is full. A Third Level, or Level Three 416, may further comprise additional customers placed under each of the Level Two 414 Referring Customers in a similar alternating left to right, right to left placement pattern. Additional levels may be added as needed.

In some embodiments, repositioning of Referring Customers in the PCPD Matrix is performed periodically, such that positions are reassigned based upon Production Points awarded in the plan during the previous production period. Production Points may be awarded based on performance criteria that produce sales and production such as; enrolling in an Auto-Purchase Program, signing-up customers on an Auto-Purchase Program, a Referring Customer's Personal Genealogy downline such as personally enrolling other Referring Customers, the number of Personally Enrolled Second Level Customers, the number of Personally Enrolled Third Level Customers, the number of Personally Enrolled Fourth Level Customers, as well as Total Group Volume.

In an exemplary embodiment, described with reference to FIG. 5A, a Referring Customer may be awarded Production Points based on performance criteria 501 that produce sales and production in a given compensation period. New Referring Customers may be awarded twelve "Jumpstart" points for signing-up on an Auto-Purchase Program that will be reduced by one point for each month they do not enroll another active customer into the program. The Referring Customer may never lose more than the original twelve points over any period of time. If the new Referring Customer enrolls one or more new active customers in any month they may keep their remaining jumpstart points. If the new Referring Customer has no new enrollees in any month they lose one of the original jumpstart points. This process may continue until all twelve jumpstart points have been lost, thereby giving new people another opportunity to move up in the marketing plan ahead of those that don't perform. A new Referring Customer may also be awarded one Production Point for each consecutive month they are personally enrolled in the Auto-Purchase Program. These are the only points in the plan that may accumulate. If the Referring Customer cancels his Auto-Purchase they will lose all points accumulated. This rewards activity and commitment and helps new Referring Customers advance in the plan.

In another exemplary embodiment, a Referring Customer may be awarded Production Points for achieving different performance criteria 503 in a given month. For example, 12 points may be awarded for signing-up on an Auto-Purchase Program, 15 Points may be awarded for having 3 Personally Enrolled Enrolling Customers (5 points each), 15 Points may be awarded for having 5 Personally Enrolled Second Level Customers (3 points each), 20 Points may be awarded for having 10 Personally Enrolled Third Level Customers (2 points each) for a total of 62 total monthly Production Points. In another exemplary embodiment, a Referring Customer may be awarded Production Points for achieving performance criteria 505 in a given month. In one embodiment, 12 points may be awarded for signing-up on an Auto-Purchase Program with an additional 3 points awarded for remaining an Auto-Purchase Customer for 3 consecutive months (1 point each per month). An additional 25 Points may be awarded for having 5 Personally Enrolled Enrolling Customers (5 points each), 45 Points may be awarded for having 15 Personally Enrolled Second Level Customers (3 points each), 40 Points may be awarded for having 20 Personally Enrolled Third Level Customers (2 points each), and 18 Points may be awarded for having 18 Personally Enrolled Fourth Level Customers (1 point each). An additional 20 Production Points may also be awarded for having 5 Personally Enrolled Retail or Auto-Purchase Customers (4 points each) for a total of 163 monthly Production Points.

In still another exemplary embodiment, another Referring Customer may be awarded even more Production Points for achieving additional performance criteria 507 in a given month. For example, 12 points may be awarded for signing-up on an Auto-Purchase Program with an additional 8 points awarded for remaining an Auto-Purchase Customer for 8 consecutive months (1 point each per month). An additional 50 Points may be awarded for having 10 Personally Enrolled Enrolling Customers (5 points each), 150 Points may be awarded for having 50 Personally Enrolled Second Level Customers (3 points each), 500 Points may be awarded for having 250 Personally Enrolled Third Level Customers (2 points each), 400 Points may be awarded for having 400 Personally Enrolled Fourth Level Customers (1 point each) and 10 Points may be awarded for having a $25,000 personal group volume for a total of 1130 monthly Production Points.

In some embodiments of the present invention Production Points may also be awarded for training and attendance at company sponsored events. Points may be awarded for attending a training class and completing a test upon completion. Different point values may be awarded depending on the complexity and importance of the course.

Figure 5B:
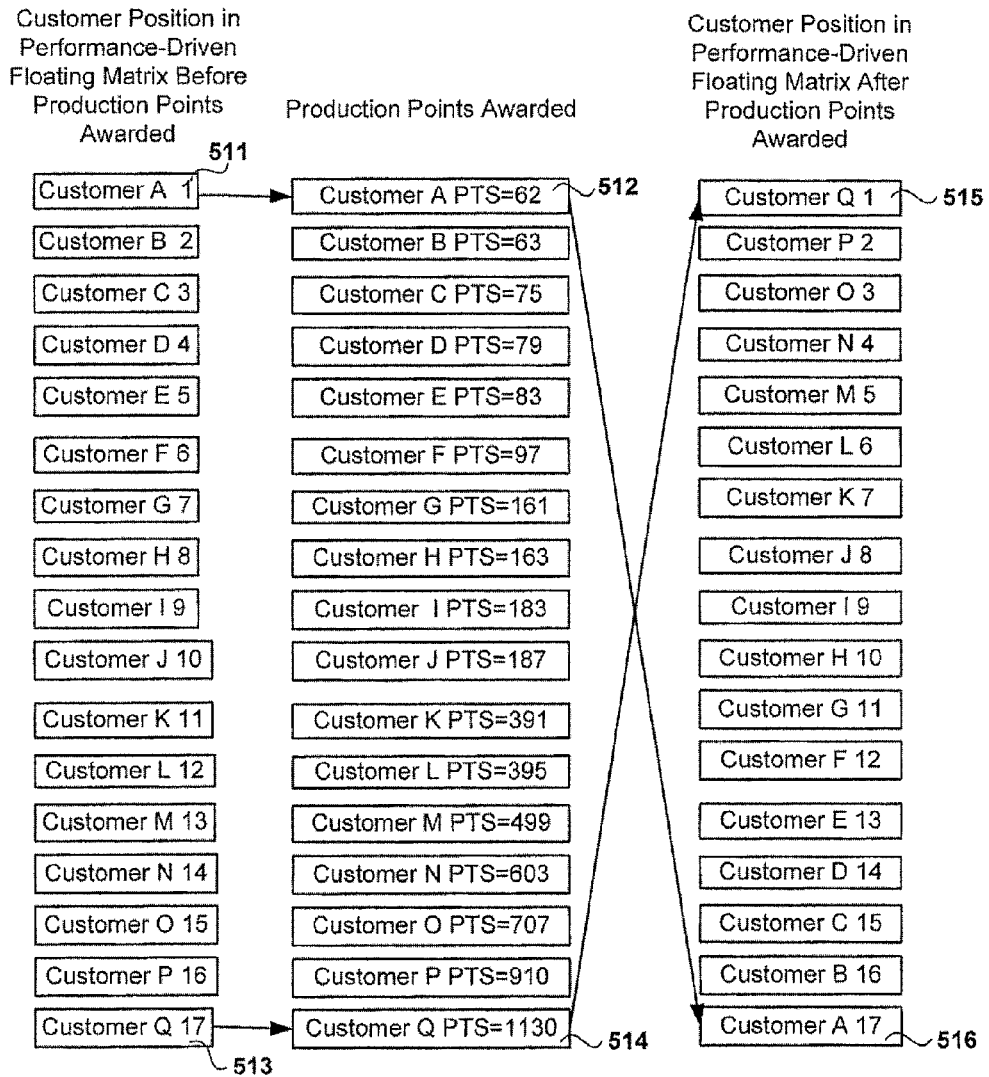
FIG. 5B illustrates an exemplary periodic repositioning of Referring Customers in a PCPD Matrix from application of customer awarded Production Points.

In some embodiments, described with reference to FIG. 5B, Referring Customer "A" 511 may be awarded a total of 62 Production Points 512 for the compensation period. Another Referring Customer, Customer "Q" 513 may be awarded a total of 1130 Production Points 514 in the same compensation period. After having been awarded the most Production Points for the compensation period, Customer "Q" 513, who was awarded 1130 Production Points 514, would be relocated to the number 1 position 515 in the PCPD matrix. Customer "A" 511, who was awarded 62 Production Points 512, the least amount for the compensation period, would therefore be relocated to the last position 516 in the PCPD matrix. The other Referring Customers would also be relocated similarly within the PCPD matrix according to the amount of Production Points awarded and the placement plan used.

Figure 6:
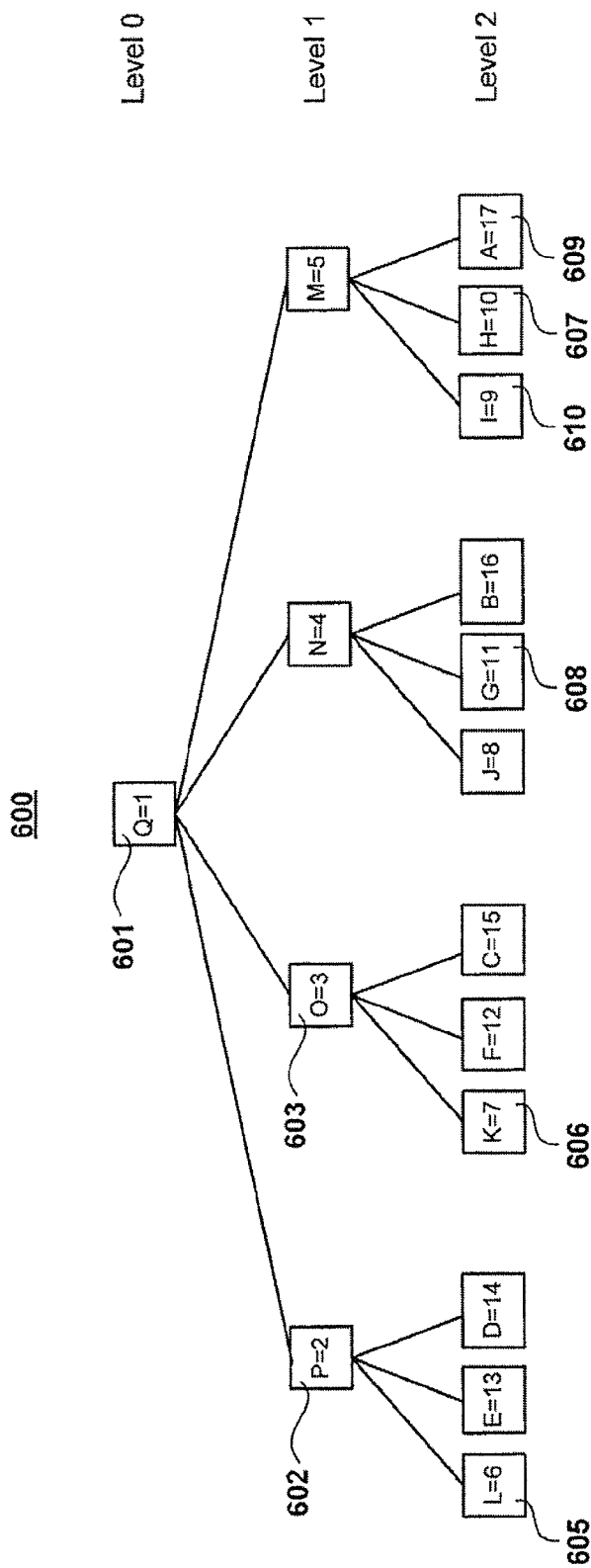
FIG. 6 illustrates an exemplary PCPD Matrix after repositioning from application of Production Points.

Some embodiments of the present invention, described with reference to FIG. 6, may comprise a repositioned PCPD matrix 600 with Customer "Q" relocated to the number 1 position 601 of the matrix. Other customers in the Repositioned PCPD matrix 600 may now also occupy new positions based upon Production Points earned in the compensation Period and may now comprise a new front line or Level 1 of participating customers with Customer "P" 602 with the second highest amount of Production Points, now occupying the first position on the front level, or Level 1, beneath Customer "Q" 601 and Customer "O" 603, with the third highest amount of Production Points, occupying the second position on Level 1 continuing on until Level 1 is filled. Referring Customers may then be placed on the next level down or Level 2 with the Referring Customer with the next highest amount of Production Points, such as Customer "L" 605, now occupying the first position on the next level, Level 2, beneath Customer "P" 602 and Customer "K" 606 occupying the first position to the left beneath Customer "O" 603. In some embodiments, the left to right, right to left placement method may be used such that Customer "H" 607, with more Production Points than Customer "G" 608, may be placed in the second position to the right of Customer "I" 610 in Level 2. Customer "A" 609, who was awarded the least amount of Production Points during the compensation period, may now occupy the last position on Level 2 in the Repositioned PCPD matrix 600.

In some embodiments of the present invention, participants may generate retail commissions through product sales for the Referring Customer who personally enrolled them in the plan. In one exemplary embodiment, with a product wholesale price of $30, a Personal Enroller may earn a $10 commission for each $40 product sold to a personally enrolled retail customer and a $5 retail commission for each $35 product sold to a personally enrolled referring or retail customer.

In some embodiments of the present invention, retail commissions may be earned each month for the activity of personally sponsored customers and a Referring Customer's personally enrolled genealogy may earn them additional points. These additional points may be needed in order to qualify for the compensation plan's bonus pools. Bonus pools may award qualifying Enrolling Customers with additional commission percentages or with additional points. In some embodiments, one bonus pool may require 25,000 points and another may require 50,000 points. In order to prevent these bonus pools from being too easily attained, in some embodiments points may only be earned through a limited number of personally sponsored generation levels. For example, in some embodiments points may only be earned through 5 personally sponsored generation levels while in others points may be limited to 10, 20 or an unlimited amount of personally sponsored generations depending on the bonus pool attainment goals and difficulty desired. Other qualifications, such as point requirements, may also be adjusted as needed.

In one exemplary embodiment of the present invention, a bonus pool may require 25,000 points while another bonus pool may require 50,000 points to qualify. Points may only be earned through 5 personally sponsored generation levels. If a Referring Customer personally sponsored four other Referring Customers on their front line or first level and each subsequent Referring Customer sponsored 4 more Referring Customers on their front lines through the 5 generation levels the original Referring Customer would have a personal genealogy with 4 customers on the first level, 16 customers on the second level, 64 customers on the third level, 256 customers on the fourth level and 1024 customers on the fifth level for a total of 1364 customers. If all 1364 customers bought one product in a month with a wholesale price of $30 the total volume for the original Referring Customer would be $40,920. If one point were awarded for each dollar in volume the original Referring Customer would earn 40,920 points, which would qualify him for the 25,000 point bonus pool but not for the 50,000 point bonus pool.

Some embodiments of the present invention may comprise Global Matching Bonus Pools. In some embodiments, the Global Matching Bonus Pools may be shared on a periodic basis with qualified Referring Customers. The Global Matching Bonus Pools may be made up from the total wholesale volume of the Retail Customer Referral Compensation Program. In some embodiments of the present invention the Global Matching Bonus Pools may comprise different individual matching bonus pools with the first matching bonus pool paying a certain percent bonus to participating Referring Customers. In some embodiments, a Referring Customer may participate in some of the Matching Bonus Pools one time only. To participate, a Referring Customer may have to have a certain number of personally enrolled active customers below them. The share of the personally enrolled active customer may be split with their qualified personal enroller or the next qualified upline Referring Customer following the personal enroller genealogy. Some embodiments may also comprise another Matching Bonus Pool, which may pay an additional percent bonus. To participate, a Referring Customer may need a greater number of personally enrolled active Referring Customers below them in their downline. The periodic share of the participating personally enrolled active Referring Customers will be split with their qualified personal enroller or the next qualified upline personal enroller following the personal enroller genealogy.

Some embodiments may comprise still another Matching Bonus Pool, which may pay an additional percent bonus. A Referring Customer may participate in this Matching Bonus Pool repeatedly. To participate, a Referring customer may need to have a set number of personally enrolled active customers below them in their downline and have reached a specified dollar volume in personally enrolled group Auto-Purchase volume, plus be actively qualified in the company's standard compensation plan. This shared bonus may be based on Pro-Rata of total personal group volume. This bonus pool may also be added to the other Matching Bonus Pools until a member qualifies. The monthly share of the participating Referring Customer may be split with their qualified personal enroller or the next qualified upline Referring Customer following the personal enroller genealogy.

Some embodiments of the present invention may comprise yet another Matching Bonus Pool, which may pay an additional percent bonus. A Referring Customer may participate in the Matching Bonus Pool repeatedly. To participate, a Referring Customer may have to achieve a set number of personally enrolled active Referring Customers below them in their downline and have a reached an even higher specified dollar amount in personally enrolled group Auto-Purchase volume, plus be actively qualified in the company's standard compensation plan. This shared bonus may be based on Pro-Rata of total personal group volume. This bonus pool may also be added to another Matching Bonus Pool until a member qualifies. The share of the participating Referring Customer may be split with their qualified personal enroller or the next qualified upline Referring Customer following the personal enroller genealogy.

In some embodiments additional Global Matching Bonus Pools are available to qualifying Referring Customers. In some embodiments up to three Global Matching Bonus Pools are offered. In yet other embodiments more than 10 Global Matching Bonus Pools are offered, wherein in each Global Matching Pool requires the Referring Customer to achieve a set number of personally enrolled active Referring Customers below them in their downline and have reached an even higher specified dollar amount in personally enrolled group Auto-purchase volume. In some embodiments, various other qualifying criteria are established.

In one preferred embodiment of the present invention, the Global Matching Bonus Pools may comprise 4 different individual levels or matching bonus pools with the first matching bonus pool paying a 2 percent bonus to participating Referring Customers. A Referring Customer may participate in the first Matching Bonus Pool one time only. To participate, a Referring Customer must have 4 personally enrolled active Referring Customers below them. The monthly share of the participating Referring Customer will be split with their qualified personal enroller or the next qualified upline Referring Customer following personal enroller genealogy. Embodiments of the present invention may also comprise a second Matching Bonus Pool, which may also pay a 2 percent bonus. A Referring Customer may participate in the second Matching Bonus Pool only one time. To participate, a Referring Customer must have 8 personally enrolled active Referring Customers below them in their downline. The monthly share of the participating Referring Customer will be split with their qualified personal enroller or the next qualified upline Referring Customer following personal enroller genealogy.

Embodiments of the present invention may also comprise a third Matching Bonus Pool, which may pay a 4 percent bonus. A Referring Customer may participate in the third Matching Bonus Pool repeatedly every month. To participate, a Referring Customer must have a set number of personally enrolled active Referring Customers below them in their personal genealogy, (in an exemplary 4×4 matrix a Referring Customer must have 8 personally enrolled active Referring Customers below them) in their downline and have reached a specified volume, such as $25,000, in personally enrolled group Auto-Purchase volume plus be actively qualified in the company's standard compensation plan. This shared bonus is based on Pro-Rata of total personal group volume. This bonus pool is added to the second Matching Bonus Pool until a member qualifies. The monthly share of the participating Referring Customer will be split with their qualified personal enroller or the next qualified upline Referring Customer following personal enroller genealogy.

Some embodiments of the present invention may also comprise a fourth Matching Bonus Pool, which may pay an additional 4 percent bonus. A Referring Customer may participate in the fourth Matching Bonus Pool 440 repeatedly every month. To participate, a Referring Customer must have a set number of personally enrolled active Referring Customers below them, (in an exemplary 4×4 matrix a Referring Customer must have 8 personally enrolled active Referring Customers below them) in their downline and have a reached a higher specified volume, such as $50,000, in personally enrolled group Auto-Purchase volume plus be actively qualified in the company's standard compensation plan. This shared bonus is based on Pro-Rata of total personal group volume. This bonus pool is added to either the second or third Matching Bonus Pools until a member qualifies. The monthly share of the participating Referring Customer will be split with their qualified personal enroller or the next qualified upline Referring Customer following personal enroller genealogy.

Other embodiments of the present invention may comprise a Personal Enroller Matching Bonus payout plan with Dynamic Compression wherein 100% of distribution of commissions for commissionable volume after retail profit is moved to the next available qualified position if a Referring Customer does not qualify. The Dynamic Compression of the Personal Enroller Matching Bonus payout plan maximizes a Referring Customer's payout so that when qualifications aren't met all available unpaid commissions are automatically "compressed" and rolled-up the line to the next qualified Referring Customer in order to maximize their payout instead of going back to the company.

Figure 7:
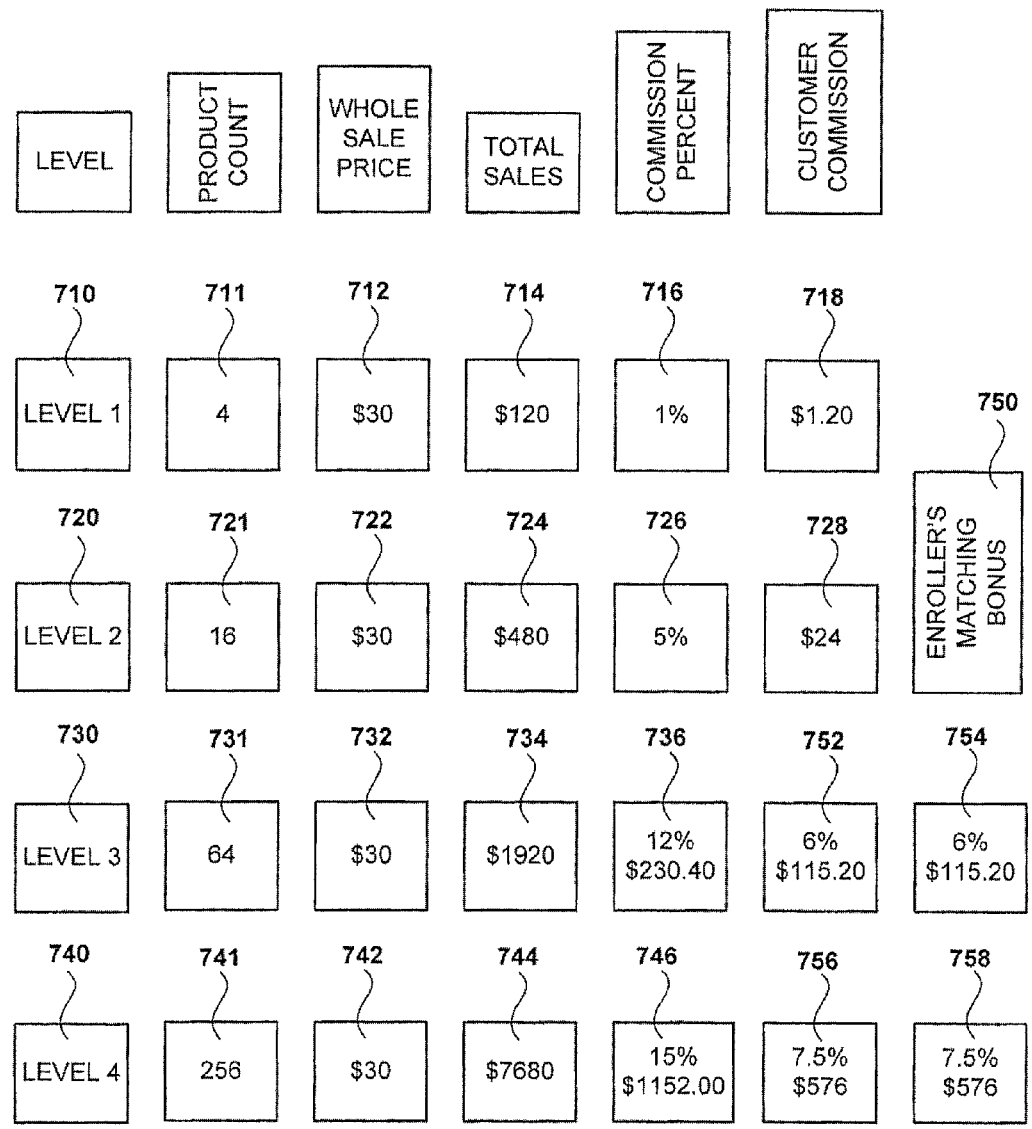
FIG. 7 illustrates a preferred embodiment of a Retail Customer Referral Compensation Program commission and bonus payout plan with a Personal Enroller Matching Bonus.

FIG. 7 illustrates an embodiment of a wherein a Referring Customer is positioned in a Floating Matrix based on the number of Production Points they earned in the previous compensation period. According to this plan, a Referring Customer is entitled to be compensated based on their position within the 4×4 PCPD matrix.

In a 4×4 PCPD matrix plan each Referring Customer is capable of receiving a commission for Referring Customers on their first four levels. For example, FIG. 7 illustrates the commission structure for a Referring Customer in a PCPD matrix plan having at least four levels below her in the matrix. In a 4×4 matrix, the Referring Customer is limited to 4 Referring Customers on their Front Line or first level. Likewise, each Referring Customer on the first level has a maximum of four people on their first level. Accordingly, in a 4×4 matrix, there is a maximum of 16 people on a Referring Customer's 2nd Level, and so on until your organization reaches a depth of 4 Levels Additional customers are moved down to the first available position and automatically added, following one of the placement plans explained above, until the level is filled. In a full 4×4 matrix this would provide for a second level with 16 Referring Customers, a third level with 64 Referring Customers and a fourth level with 256 Referring Customers. All active Referring Customers may be qualified for payout on the first two levels. To qualify for payout on Levels 3 and 4 a Personal Enroller must have the corresponding number of personally sponsored Referring Customers. If the Personal Enroller does not qualify, the matching bonus rolls up to the first qualified personal enroller, following personal enroller genealogy.

In some embodiments of the present invention, described with reference to FIG. 7, a product has a retail price of $40, a discounted Auto-Purchase price of $35, and a wholesale price of $30. In this embodiment, a Referring Customer earns a $5 retail commission on each personally sponsored Auto-Purchase sale and $10 retail commission on each personally sponsored retail sale. The remaining $30 wholesale price is revenue that is commissionable in a bonus payout plan.

Figure 10:
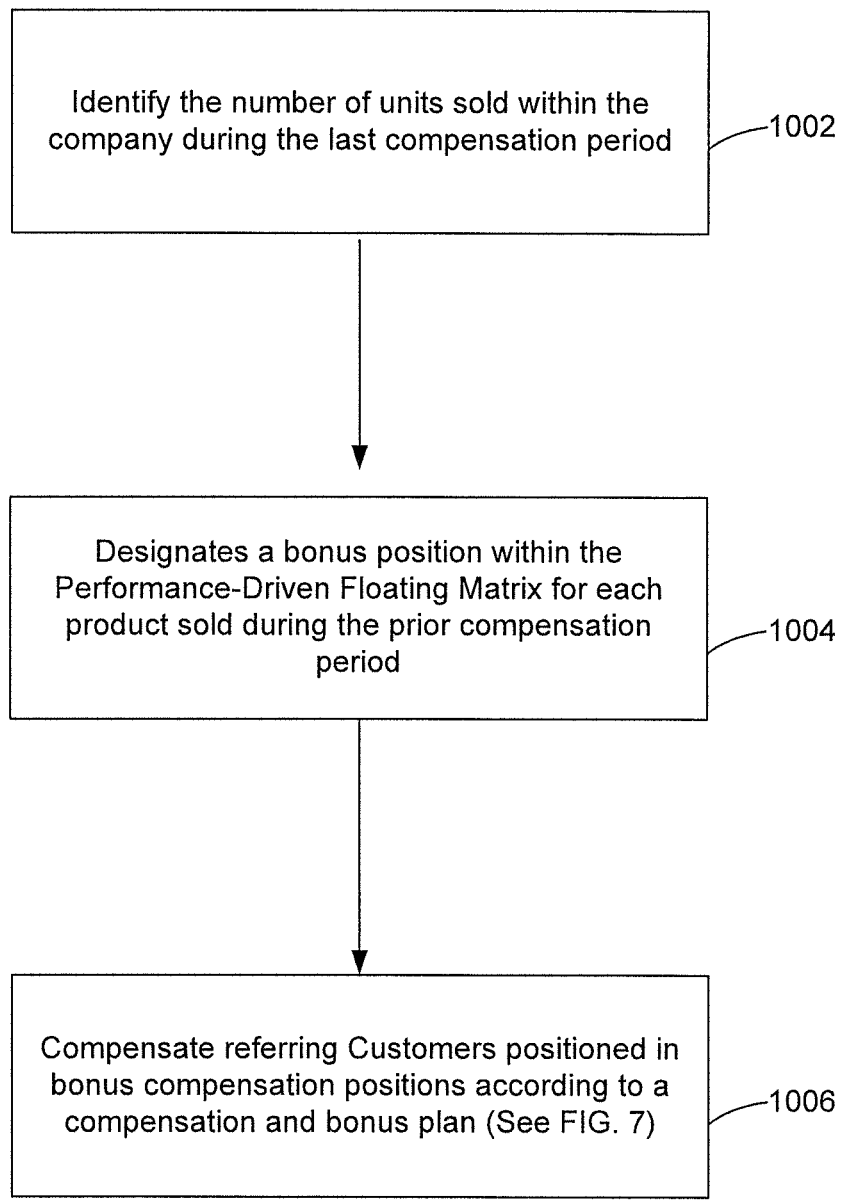
FIG. 10 illustrates a flowchart of a method of compensating Referring Customers within in a PCPD Matrix.

In some embodiments, the sum of all remaining wholesale revenue in an entire business network is utilized in a bonus payout plan. For example, in some embodiments, as illustrated in FIG. 10, a company can identify the number of units, or products, sold within the company, during the last compensation period 1002. Next, the business network designates a bonus position within the PCPD matrix to participate in a bonus payout plan for each product sold during the prior compensation period 1004. For example, if 1,000 products were sold during the prior compensation period then 1,000 positions within the PCPD matrix are selected to participate in the bonus payout plan. In some embodiments, the positions within the PCPD matrix designated for the highest Production Point earners are the positions selected to participate in the bonus payout plan. Continuing the example, if 1,000 products are sold in the prior compensation period, then in the current compensation period the top 1,000 positions designated for the top 1,000 Production Point earners are selected to participate in the bonus payout plan. Lastly, Referring Customers positioned in bonus compensation positions are compensated according to a compensation and bonus plan 1006, such as that detailed in FIG. 7, which will now be discussed.

FIG. 7 illustrates one embodiment of how wholesale revenue from within a business network is distributed via a bonus payout plan. This embodiment assumes that each of the four levels illustrated are filled with a Referring Customer, and that each of the four levels 710, 720, 730, and 740 include positions selected to participate in the bonus payout plan. As show, the bonus payout plan includes a Level 1 710 payout of $1.20 718 based on a product count of 4 711 and a wholesale price of $30 712 for a total sales volume of $120 714 and a Level 1 commission of 1% 716. The bonus payout plan comprise a Level 2 720 payout of $24 728 based on a product count of 16 721 and a wholesale price of $30 722 for a total sales volume of $480 724 and a Level 2 commission of 5% 726.

As further illustrated in FIG. 7, the bonus plan also comprises a Level 3 730 payout of $230.40 736 based on a product count of 64 731 and a wholesale price of $30 732 for a total sales volume of $1920 734 and a Level 3 commission of 12% 736 which may be split with the Referring Customer's Personal Enroller. As explained above, the Referring Customer's Personal Enroller is the person who enrolled the Referring Customer. For a Personal Enroller to qualify for a matching Enroller Bonus of 6% 754 on Level 3, they must also have the corresponding number of personally enrolled Referring Customers. If the Personal Enroller does not qualify the matching bonus rolls upline in the matrix to the first personally enrolled upline Referring Customer that qualifies following personal enroller genealogy.

The bonus payout plan of FIG. 7 also comprises a Level 4 740 payout of $1152 746 based on a product count of 256 741 and a wholesale price of $30 742 for a total sales volume of $7,680 744 and a Level 4 commission of 15% 746 which may be split with the Referring Customer's Personal Enroller. For a Personal Enroller to qualify for a matching Enroller Bonus 758 of 7.5% on Level 4, they must have the corresponding number of personally enrolled Referring Customers. If the Personal Enroller does not qualify, the matching bonus rolls up the matrix to the first personally enrolled upline Referring Customer that does qualify following personal enroller genealogy.

In summation, FIG. 7 illustrates one embodiment of a PCPD matrix plan, wherein a Referring customer is capable of receiving compensation within a compensation period for the persons in her lower four levels within the PCPD matrix. In addition, the Referring customer can receive additional compensation if she is a Personal Enroller and if she and the person enrolled qualify for a matching bonus. Accordingly, this plan encourages Referring Customers to consistently earn Production Points, so that after each compensation period she is positioned high within the PCPD matrix, having many persons in lower levels than she, and so that she qualifies for Matching Bonuses, as described above and illustrated in FIG. 7.

Figure 8:
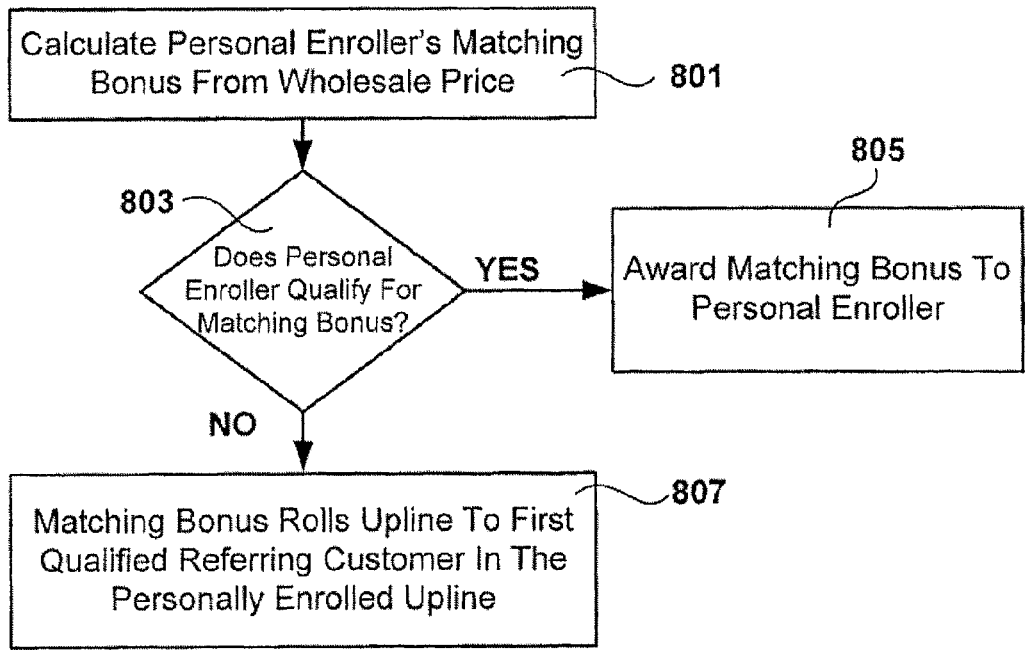
FIG. 8 illustrates a flowchart of a preferred method of awarding a Personal Enroller Matching Bonus.

In another exemplary embodiment, described with reference to FIG. 8, a Personal Enroller's Matching Bonus is calculated 801 from the wholesale volume of product sold for a specified compensation period. If the Personal Enroller qualifies 803 for the matching Personal Enroller Bonus the bonus is awarded 805 to him. If the Personal Enroller does not qualify for the matching bonus the matching bonus is rolled upline 807 to the first qualified Referring Customer in the personally enrolled upline.

Figure 9:
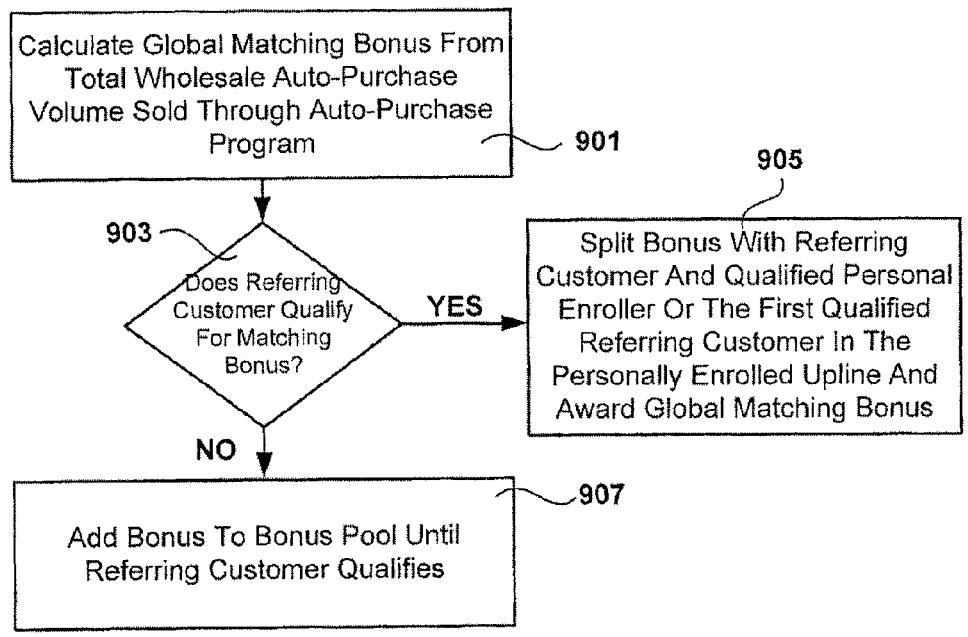
FIG. 9 illustrates a flowchart of a preferred method of awarding Global Matching Bonuses.

In still other exemplary embodiments, described with reference to FIG. 9, a Global Matching Bonus is calculated 901 from the total wholesale Auto-Purchase volume sold through the Auto-Purchase Program for a specified compensation period. If a Referring Customer qualifies 903 for the Global Matching Bonus, the bonus is split 905 between the Referring Customer and the qualified Personal Enroller or the first qualified upline Referring Customer and the bonus is awarded. If the Referring Customer does not qualify for the Global Matching Bonus the Global Matching Bonus is added 907 to the Global Matching Bonus Pool until the Referring Customer does qualify.

In some embodiments of the present invention, the sum of all remaining company wholesale revenue is utilized in a bonus payout plan.

Figure 11:
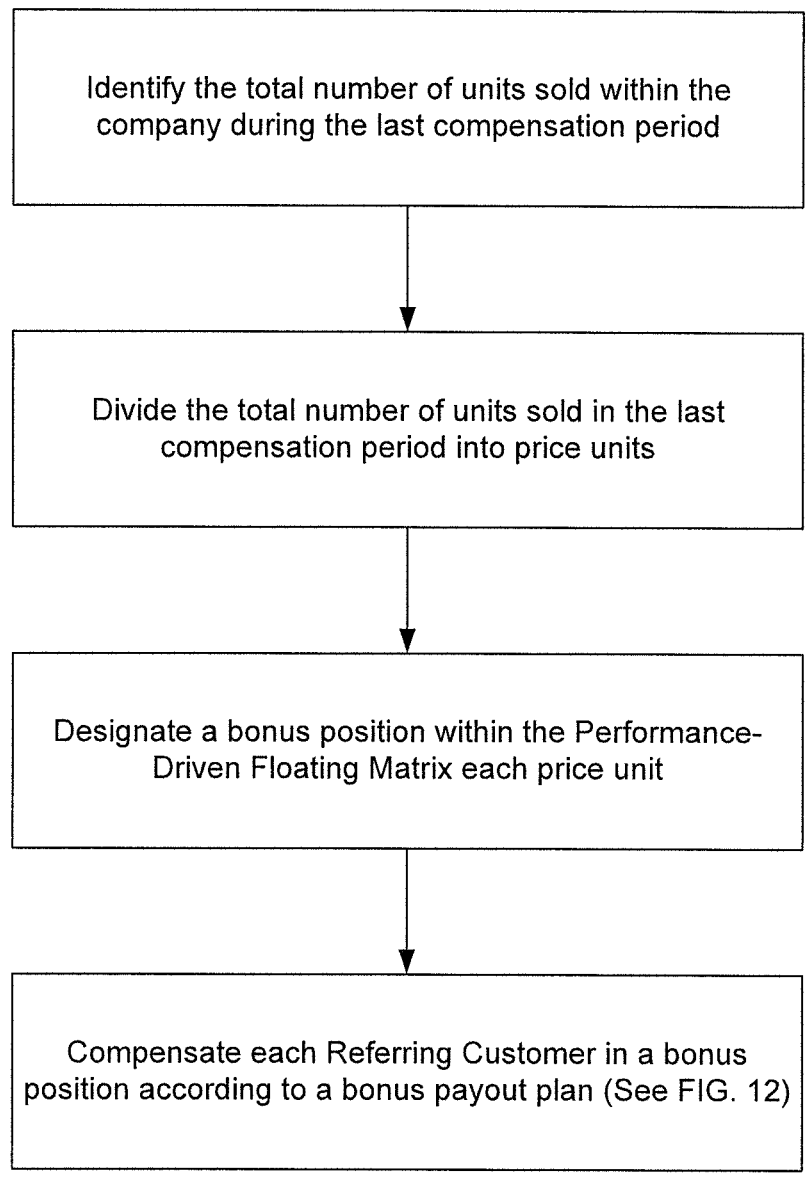
FIG. 11 illustrates a flowchart of another method of compensating Referring Customers within in a PCPD Matrix.

In some embodiments, a company allocates one or more positions within the PCPD matrix for each product sold during the prior compensation period. In some embodiments, as illustrated in FIG. 11, the total company sales volume for the last compensation period is identified 1102 and then divided into production units (also known as "price units") 1104. In some embodiments, where the company sales only a single product, the production unit is a factor of the product price. In other embodiments, the production unit is a factor of the total sales volume. For example, any factor of the product sales price or any factor of the total company sales revenue can be used as a unit price according to these embodiments of the present invention. In other embodiments, the production unit can be a multiple of the product price, thus decreasing the number of bonus positions within the PCPD matrix. In yet other embodiments, the production unit is approximately a fixed monetary value, such that if a company carries multiple products, the company can assign each product a specific number of production units based on the value of the product. Next, a bonus position within the PCPD matrix is designated for each production unit 1106. Lastly, each Referring Customer in a bonus position is compensated according to a bonus payout plan 1108, such as that illustrated in FIG. 12.

To illustrate the process illustrated in FIG. 11, assume that the total company sales volume during the previous compensation period was $35,000, comprising the sale of 1000 $35 products. Then assume that a production unit price of $7 is selected. Dividing the total sales volume of $35000 into the production unit price of $7 results in 5000 bonus positions. Lastly, each Referring Customer in a bonus compensation position is compensated according to a bonus payout plan, such as that illustrated in FIG. 12. Alternatively, had the process of FIG. 10 been used in this illustration, only 1000 bonus positions would have been created because only 1000 products were sold. Thus, under the process of FIG. 11 more Referring Customers in the PCPD matrix will participate in the bonus payout plan.

Figure 12:
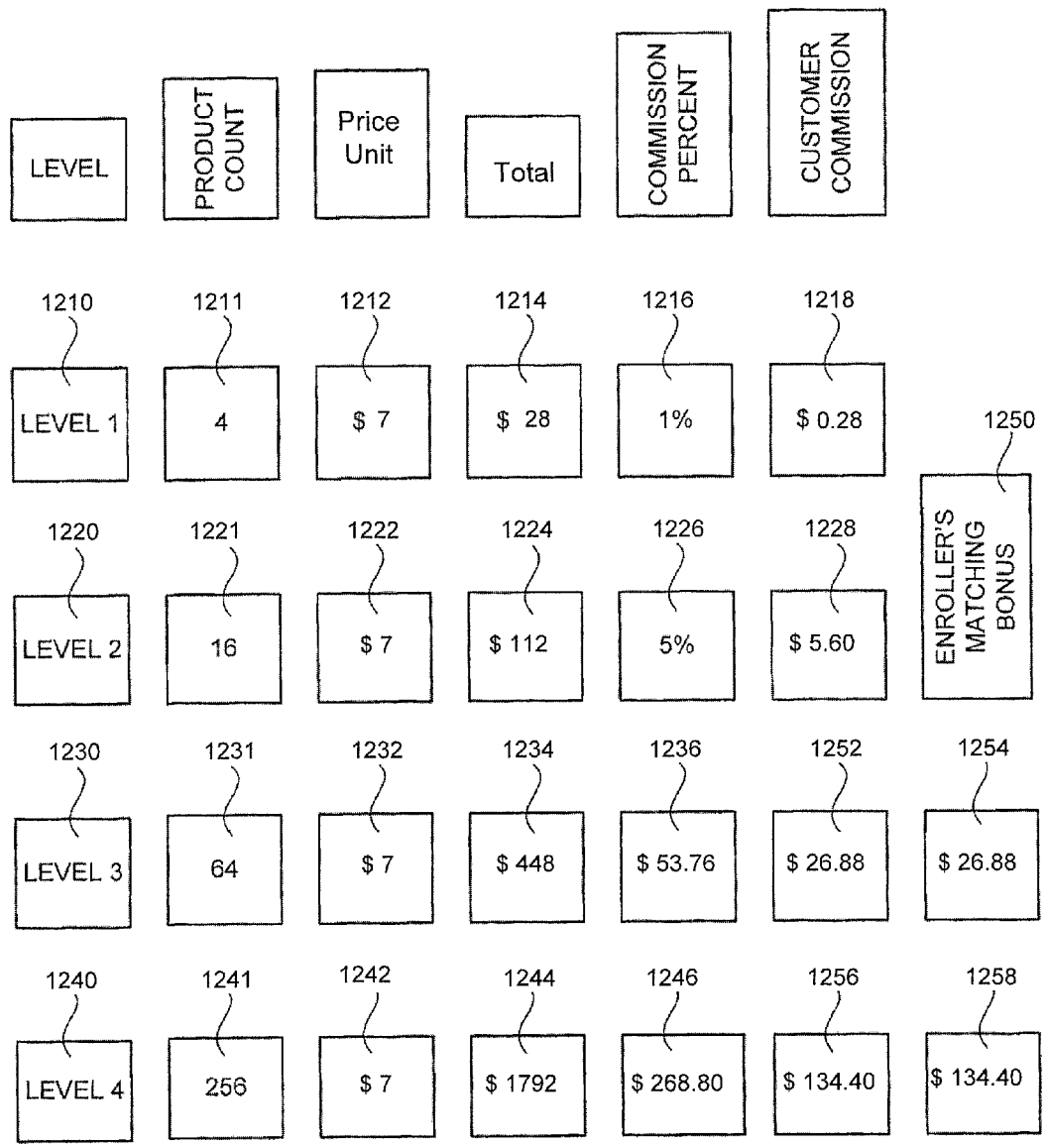
FIG. 12 illustrates an embodiment of a Retail Customer Referral Compensation Program commission and bonus payout plan with a Personal Enroller Matching Bonus.

FIG. 12 illustrates a commission payment structure for a Referring Customer in a PCPD matrix plan having at least four levels below her in the matrix. Those of skill in the art will recognize that a variety of matrix sizes can be utilized with the present invention. For example, in some embodiments a binary matrix is used. In other embodiments 3×3 matrix is used. In other embodiments a 5×5 matrix is used. Referring back to the 4×4 matrix of FIG. 12, the Referring Customer in a bonus position is compensated for 4 Referring Customers on their Front Line or first level 1210, if those Referring Customers are also in a bonus position. Likewise, the Referring Customer may be compensated for the Referring Customers on her second 1220, third 1230, and fourth level 1240 if those Referring Customers are also in a bonus position. However, to qualify for payout on Levels 3 and 4 the Referring Customer must qualify under a matching bonus plan, as described above.

FIG. 12 also illustrated the matching bonus that is available to the Personal Enroller of a Referring Customer 1050. However, to qualify for payout on Levels 3 and 4 of the Referring Customer, the Personal Enroller must also qualify for the matching bonus, as described above. If the Personal Enroller does not qualify, the matching bonus rolls up to the first qualified personal enroller, following personal enroller genealogy.

In some embodiments of the present invention, described with reference to FIG. 12, a product has a retail price of $40 and a wholesale price of $35. The product is then divided into a production unit of $7. This creates 5 bonus positions for every product sold in the previous compensation period. In this embodiment, the $30 wholesale price from each sold product is revenue is commissionable in a bonus payout plan.

FIG. 12 assumes that each of the positions in the four levels illustrated is filled with a Referring Customer, and that each of the four levels 1210, 1220, 1230, and 1240 include positions selected to participate in the bonus payout plan. If any level were not filled, the Referring Customer would not receive any commission for that level. As show, the bonus payout plan includes a Level 1 1210 payout of $0.28 1218 based on a product count of 4 1211 and a production unit price of $7 1212 for a total production unit volume of $28 1214 and a Level 1 commission of 1% 1212. The bonus payout plan comprise a Level 2 1220 payout of $5.60 1228 based on a product count of 16 1221 and a production unit price of $7 1222 for a total production unit volume of $112 1224 and a Level 2 commission of 5% 726.

As further illustrated in FIG. 12, the bonus plan also comprises a Level 3 1230 payout of $53.76 1236 based on a product count of 64 1231 and a production unit price of $7 1232 for a total production unit volume of $448 1234 and a Level 3 commission of 12% 1236 which may be split with the Referring Customer's Personal Enroller. As explained above, the Referring Customer's Personal Enroller is the person who enrolled the Referring Customer. For a Personal Enroller to qualify for a matching Enroller Bonus of 6% 1254 on Level 3, they must also have the corresponding number of personally enrolled Referring Customers. If the Personal Enroller does not qualify the matching bonus rolls upline in the matrix to the first personally enrolled upline Referring Customer that qualifies following personal enroller genealogy.

The bonus payout plan of FIG. 12 also comprises a Level 4 1240 payout of $268 1246 based on a product count of 256 1241 and a production unit price of $7 1242 for a total production unit volume of $1792 1244 and a Level 4 commission of 15% 1246 which may be split with the Referring Customer's Personal Enroller. For a Personal Enroller to qualify for a matching Enroller Bonus 1258 of 7.5% on Level 4, they must have the corresponding number of personally enrolled Referring Customers. If the Personal Enroller does not qualify, the matching bonus rolls up the matrix to the first personally enrolled upline Referring Customer that does qualify following personal enroller genealogy.

In summation, FIG. 12 illustrates one embodiment of a PCPD matrix plan, wherein a Referring customer is capable of receiving compensation within a compensation period for the persons in her lower four levels within the PCPD matrix. In addition, the Referring customer can receive additional compensation if she is a Personal Enroller and if she and the person enrolled qualify for a matching bonus. Accordingly, this plan encourages Referring Customers to consistently earn Production Points, so that after each compensation period she is positioned high within the PCPD matrix, having many persons in lower levels than she, and so that she qualifies for Matching Bonuses. In addition, this plan differs from that of FIG. 7 in that it allows more Referring Customers to participate in the bonus payout plan. When Referring Customers receive bonus commissions for their work during the previous compensation period they are motivated during the current compensation period to qualify for similar bonuses in the current compensation period. Thus, by allowing more Referring Customers to receive bonus commissions more Referring Customers can be motivated and stay motivated for each subsequent compensation period.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method, performed by one or more processors of a computer system, for providing a customer matrix for compensating customers enrolled in a program based on a position in which a customer is placed within the matrix, the method comprising:
    generating, by the one or more processors, a customer matrix that includes a plurality of positions arranged hierarchically in a plurality of levels, wherein at least one level includes fewer positions than a layer immediately below the level in the matrix, the customer matrix for arranging customers enrolled in a program based on performance of the customers in the program;
    associating, by the one or more processors, a compensation formula with each position in the customer matrix, wherein the compensation formula for at least one position in one level of the customer matrix is different than the compensation formula for at least one position in a second level of the customer matrix, and wherein a compensation formula for a position at a higher level yields a higher compensation amount than a compensation formula for a position at a lower level;
    accessing, by the one or more processors and for each of a plurality of customers in the program, a number of production points earned by the customer during a first production period, the production points being earned at least partially by one or more of the following:
    enrolling another customer into the program;
    enrolling another customer into an auto-purchase program; or
    attending a training event or activity;
    placing, by the one or more processors, each customer in the customer matrix based on the number of production points earned by the customer during the first production period such that customers having earned a higher number of production points in the first production period are placed at higher levels in the hierarchy than customers having earned a lower number of production points in the first production period;
    calculating, by the one or more processors and for each customer in the customer matrix, a compensation amount to be paid to the customer for performance during the first production period, the compensation amount being calculated based on:
        the compensation formula associated with the position in the matrix to which the customer was assigned based on the number of production points earned by the customer during the first production period; and
        an amount of sales generated by the customer during the first production period;
    accessing, by the one or more processors and for each of a plurality of customers, a number of production points earned by the customer during a second production period; and
    repositioning, by the one or more processors, each customer in the customer matrix based on the number of production points earned by the customer during the second production period such that customers having earned a higher number of production points in the second production period are placed at higher levels in the hierarchy than customers having earned a lower number of production points in the second production period, and such that customers receive a compensation amount for sales generated during the second production period based on the compensation formula of the position in the matrix to which the customers were repositioned.

2. The method of claim 1, wherein customers are awarded production points based on each of:
    sales generated by the customer during the first production period;
    participating in training programs during the first production period; or
    enrolling other customers during the first production period.

3. The method of claim 2, wherein a predefined number of production points are awarded for selling a particular product.

4. The method of claim 2, wherein the number of production points awarded for enrolling other customers is dependent on whether the customer enrolled other customers in a previous production period.

5. The method of claim 1, wherein customers are placed and repositioned in the customer matrix using a top down and left to right scheme.

6. The method of claim 5, wherein customers placed or repositioned at a same level in the customer matrix are ordered using a left to right, right to left scheme.

7. The method of claim 1, wherein the customer matrix is one of: a binary matrix, a 2×2 matrix, a 3×3 matrix, a 4×4 matrix, a 5×5 matrix, a 6×6 matrix, a 7×7 matrix, an 8×8 matrix, a 9×9 matrix, and a 10×10 matrix.

8. The method of claim 1, wherein in the case that two or more customers have the same number of production points, the customer that is the more recently enrolled is positioned before a customer that is less recently enrolled.

9. The method of claim 1, wherein the first and second production periods are one month production periods.

10. The method of claim 1, further comprising:
    maintaining, by the computer system, a fixed matrix that includes a plurality of hierarchically arranged positions, each customer in the customer matrix being arranged in the fixed matrix based on the position of another customer who enrolled the customer.

11. The method of claim 10, wherein each customer, in addition to the compensation amount paid based on the position of the customer in the customer matrix, is paid a second compensation amount based on the position of the customer in the fixed matrix.

12. One or more non-transitory computer storage media storing computer executable instructions which when executed by one or more processors perform a method for providing a customer matrix for compensating customers enrolled in a program based on a position in which a customer is placed within the matrix, the method comprising:

generating, by the one or more processors, a customer matrix that includes a plurality of positions arranged hierarchically in a plurality of levels, wherein at least one level includes fewer positions than a layer immediately below the level in the matrix, the customer matrix for arranging customers enrolled in a program based on performance of the customers in the program;

associating, by the one or more processors, a compensation formula with each position in the customer matrix, wherein the compensation formula for at least one position in one level of the customer matrix is different than the compensation formula for at least one position in a second level of the customer matrix, and wherein a compensation formula for a position at a higher level yields a higher compensation amount than a compensation formula for a position at a lower level;

accessing, by the one or more processors and for each of a plurality of customers in the program, a number of production points earned by the customer during a first production period, the production points being earned at least partially by one or more of the following:
enrolling another customer into the program;
enrolling another customer into an auto-purchase program; or
attending a training event or activity;

placing, by the one or more processors, each customer in the customer matrix based on the number of production points earned by the customer during the first production period such that customers having earned a higher number of production points in the first production period are placed at higher levels in the hierarchy than customers having earned a lower number of production points in the first production period;

calculating, by the one or more processors and for each customer in the customer matrix, a compensation amount to be paid to the customer for performance during the first production period, the compensation amount being calculated based on:
the compensation formula associated with the position in the matrix to which the customer was assigned based on the number of production points earned by the customer during the first production period; and
an amount of sales generated by the customer during the first production period;

accessing, by the one or more processors and for each of a plurality of customers, a number of production points earned by the customer during a second production period; and repositioning, by the one or more processors, each customer in the customer matrix based on the number of production points earned by the customer during the second production period such that customers having earned a higher number of production points in the second production period are placed at higher levels in the hierarchy than customers having earned a lower number of production points in the second production period, and such that customers receive a compensation amount for sales generated during the second production period based on the compensation formula of the position in the matrix to which the customers were repositioned.

13. A method, performed by a computer system, for providing a fixed matrix and a customer matrix for compensating customers enrolled in a program based on a position in which a customer is placed within each matrix, the method comprising:

maintaining, by the computer system, a fixed matrix that includes a plurality of hierarchically arranged positions to each of which a customer is assigned based on the position of another customer who enrolled the customer in the program;

calculating, by the computer system and for each customer in the fixed matrix, a downline compensation amount based at least partially on sales made by other customers that are positioned below the customer in the fixed matrix;

generating, by the one or more processors, a customer matrix that includes a plurality of positions arranged hierarchically in a plurality of levels, wherein at least one level includes fewer positions than a layer immediately below the level in the matrix, the customer matrix for arranging customers enrolled in a program based on performance of the customers in the program;

associating, by the one or more processors, a compensation formula with each position in the customer matrix, wherein the compensation formula for at least one position in one level of the customer matrix is different than the compensation formula for at least one position in a second level of the customer matrix, and wherein a compensation formula for a position at a higher level yields a higher compensation amount than a compensation formula for a position at a lower level;

accessing, by the one or more processors and for each of a plurality of customers in the program, a number of production points earned by the customer during a first production period, the production points being earned at least partially by one or more of the following:
enrolling another customer into the program;
enrolling another customer into an auto-purchase program; or
attending a training event or activity;

placing, by the one or more processors, each customer in the customer matrix based on the number of production points earned by the customer during the first production period such that customers having earned a higher number of production points in the first production period are placed at higher levels in the hierarchy than customers having earned a lower number of production points in the first production period;

calculating, by the one or more processors and for each customer in the customer matrix, a compensation amount to be paid to the customer for performance during the first production period, the compensation amount being calculated based on:
the compensation formula associated with the position in the matrix to which the customer was assigned based on the number of production points earned by the customer during the first production period; and
an amount of sales generated by the customer during the first production period;

accessing, by the one or more processors and for each of a plurality of customers, a number of production points earned by the customer during a second production period; and repositioning, by the one or more processors, each customer in the customer matrix based on the number of production points earned by the customer during the second production period such that customers having earned a higher number of production points in the second production period are placed at higher levels in the hierarchy than customers having earned a lower number of production points in the second production period, and such that customers receive a compensation amount for sales generated during the second production period based on the compensation formula of the position in the matrix to which the customers were repositioned.

* * * * *